(12) United States Patent
Saito

(10) Patent No.: US 6,542,206 B1
(45) Date of Patent: Apr. 1, 2003

(54) LIQUID CRYSTAL DISPLAY FASTENING METHOD AND EQUIPMENT WITHOUT SCREW HOLES IN BASE AND COVER PORTIONS

(75) Inventor: Yoshiyuki Saito, Yamagata (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/550,743

(22) Filed: Apr. 17, 2000

(30) Foreign Application Priority Data

Apr. 20, 1999  (JP) .......................................... 11-111639

(51) Int. Cl.⁷ ............................................ G02F 1/1336
(52) U.S. Cl. ....................................................... 349/58
(58) Field of Search ............................. 349/58; 361/681

(56) References Cited

U.S. PATENT DOCUMENTS

| 5,946,061 | A | * | 8/1999 | Kurihara et al. ............... | 349/58 |
| 6,330,148 | B1 | * | 12/2001 | Won et al. ...................... | 349/58 |
| 6,373,537 | B2 | * | 4/2002 | Yun et al. ....................... | 349/58 |
| 6,411,501 | B1 | * | 6/2002 | Cho et al. ....................... | 349/58 |
| 6,424,390 | B1 | * | 7/2002 | Chen et al. ..................... | 349/58 |

FOREIGN PATENT DOCUMENTS

| JP | 5-100212 | 4/1993 |
| JP | 7-170083 | 7/1995 |
| JP | 9-113880 | 5/1997 |
| JP | 9-330039 | 12/1997 |
| JP | 10-168424 | 6/1998 |
| JP | 10-198284 | 7/1998 |
| JP | 10-207630 | 8/1998 |
| JP | 11-6998 | 1/1999 |
| JP | 11-7000 | 1/1999 |

* cited by examiner

*Primary Examiner*—James Dudek
(74) *Attorney, Agent, or Firm*—Dickstein, Shapiro, Morin & Oshinsky, LLP.

(57) ABSTRACT

An LCD fastening method and equipment for using common portions necessary for fastening a color LCD display, that is, common portions suitable for various kinds of color LCD display are disclosed, thereby omitting the process of attaching the LCD by using screws inserted from the outside of an external frame and improving the appearance. The method comprises the steps of attaching brackets to a color LCD using first fastening screws inserted through holes provided in the brackets; attaching the brackets to an LCD base by inserting second fastening screws through holes provided in the brackets into bosses provided in the LCD base; and attaching an LCD cover to the LCD base by engaging a predetermined number of latches provided in the LCD cover with corresponding first ribs provided in the LCD base.

12 Claims, 5 Drawing Sheets

LIQUID CRYSTAL DISPLAY FASTENING METHOD AND EQUIPMENT WITHOUT SCREW HOLES IN BASE AND COVER PORTIONS

BACKGROUND OF THE INVENTION

1. Field of the Invention

The present invention relates to an LCD (liquid crystal display) fastening method and equipment using common fastening portions suitable for various kinds of color LCDs, and improving the appearance of the display.

This application is based on Patent Application No. Hei 11-111639 filed in Japan, the contents of which are incorporated herein by reference.

2. Description of the Related Art

FIG. 4 is an assembly drawing for explaining a conventional method of fastening the LCD. FIG. 5 is an enlarged view of portion A in FIG. 4.

In FIG. 4, reference numeral 1 indicates an LCD cover, reference numeral 2 indicates a color LCD, reference numerals 19 indicate brackets, reference numeral 7 indicates an LCD base, reference numerals 13 indicate bosses, reference numerals 20, 21, and 200 indicate holes for fastening screws, reference numerals 11 and 15 indicate fastening screws, and reference numerals 16 indicate latches.

With reference to FIG. 4, in the conventional LCD fastening method, holes 21 through which fastening screws 11 are inserted are provided in the LCD base 7. In the above structure, first, fastening screws 15 are inserted into bosses 13 (provided in the LCD base 7) via holes 200 (provided in the brackets 19) so as to combine the base and brackets. Next, the LCD cover 1 is attached to the base 7 by inserting fastening screws 11 into holes 21 and holes provided in four latches, as shown in FIG. 5. The screws 11 are further inserted into holes 20 provided in the brackets 19. That is, brackets 19 are fastened to LCD 2 by using fastening screws 11 passing through holes 20 provided in the brackets. Examples of the related conventional technique are disclosed, for example, in Japanese Unexamined Patent Applications, First Publications, Nos. Hei 5-100212, Hei 7-170083, Hei 10-168424, Hei 10-207630, and Hei 11-6998.

The conventional technique has the following problems. The first problem is a difficulty in using common portions suitable for various kinds of color LCD displays 2 of a portable laptop (or notebook) personal computer. The second problem is to have a process of attaching the LCD display 2 using fastening screws inserted from the outside of an external frame, which is not preferable in view of the appearance.

SUMMARY OF THE INVENTION

In consideration of the above circumstances, an objective of the present invention is to provide an LCD fastening method and equipment for using common portions necessary for fastening a color LCD display, that is, common portions suitable for various kinds of color LCD display, thereby omitting the process of attaching the LCD by using screws inserted from the outside of an external frame and improving the appearance.

Therefore, the present invention provides an LCD fastening method comprising the steps of:
- attaching brackets to a color LCD using first fastening screws inserted through holes provided in the brackets;
- attaching the brackets to an LCD base by inserting second fastening screws through holes provided in the brackets into bosses provided in the LCD base; and
- attaching an LCD cover to the LCD base by engaging a predetermined number of latches provided in the LCD cover with corresponding first ribs provided in the LCD base.

The present invention further provides an LCD fastening method comprising the steps of:
- attaching brackets to a color LCD by inserting fastening protrusions provided in the brackets into corresponding holes provided in the color LCD;
- attaching the brackets to an LCD base by inserting second fastening screws through holes provided in the brackets into bosses provided in the LCD base; and
- attaching an LCD cover to the LCD base by engaging a predetermined number of latches provided in the LCD cover with corresponding first ribs provided in the LCD base.

In either method, the step of attaching the brackets to the LCD base may further include engaging insert portions provided in the brackets with second ribs provided in an upper face of the LCD base.

The present invention also provides LCD fastening equipment comprising:
- brackets attached to a color LCD by using first fastening screws inserted through holes provided in the brackets;
- an LCD base to which the brackets are attached by inserting second fastening screws through holes provided in the brackets into bosses provided in the LCD base; and
- an LCD cover attached to the LCD base by engaging a predetermined number of latches provided in the LCD cover with corresponding first ribs provided in the LCD base.

The present invention also provides LCD fastening equipment comprising:
- brackets attached to a color LCD by inserting fastening protrusions provided in the brackets into corresponding holes provided in the color LCD;
- an LCD base to which the brackets are attached by inserting second fastening screws through holes provided in the brackets into bosses provided in the LCD base; and
- an LCD cover attached to the LCD base by engaging a predetermined number of latches provided in the LCD cover with corresponding first ribs provided in the LCD base.

In either equipment, the brackets may further include insert portions engaged with second ribs provided in an upper face of the LCD base.

According to the present invention, the following effects can be obtained.

The first effect is that a common LCD base can be used for various kinds of color LCDs without providing holes for fastening screws in the base, thereby reducing manufacturing man-hours.

The second effect is that a common LCD cover can be used for various kinds of color LCDs without providing holes for fastening screws in the cover, thereby reducing manufacturing man-hours.

The third effect is that the fastening method can be selected by selecting brackets suitable for the relevant color LCD. Therefore, it is unnecessary to provide holes for fitting screws in the LCD base and LCD cover, and a preferable appearance will appeal to users.

DESCRIPTION OF THE PREFERRED EMBODIMENTS

Hereinafter, embodiments according to the present invention will be explained in detail with reference to the drawings.

First Embodiment

Figure 1:
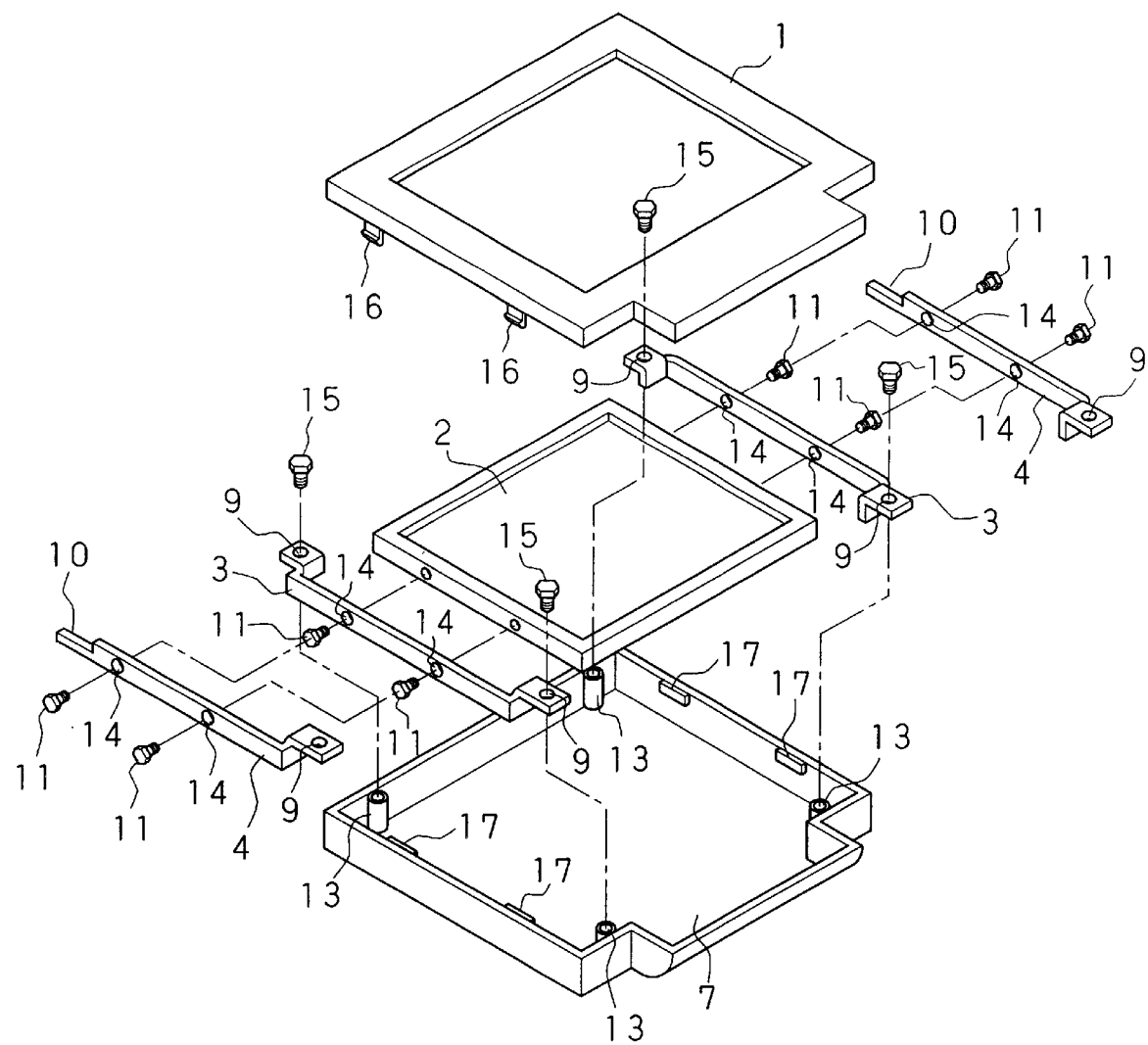
FIG. 1 is an assembly drawing for explaining the LCD fastening method and equipment of the first and second embodiments.

FIG. 1 is an assembly drawing for explaining the LCD fastening method and equipment of the first embodiment. In this figure, brackets 3 and 4 are shown as being used in the same equipment; however, these brackets are alternative parts or members, and are not used at the same time. Brackets 3 are used in the first embodiment, and brackets 4 are used in the second embodiment, In FIG. 1, reference numeral 1 indicates an LCD cover, reference numeral 2 indicates a color LCD, reference numerals 3 indicate brackets, reference numeral 7 indicates an LCD base, reference numerals 13 indicate bosses, reference numerals 9 and 14 indicate holes for fastening screws, reference numerals 11 and 15 indicate fastening screws, reference numerals 16 indicate latches, and reference numerals 17 indicate ribs.

With reference to FIG. 1, in the present embodiment, holes 14 are provided in brackets 3, and in the first step, the brackets 3 are attached to LCD 2 by using fastening screws 11. In the next step, the brackets 3 are attached to LCD base 7, by inserting the fastening screws 15 via holes 9 (provided in brackets 3) into corresponding bosses 13 provided in the base 7. In the following step, four latches 16, 16 . . . provided in the LCD cover 1 are engaged with corresponding ribs 17 provided in the LCD base 7, so that the LCD cover 1 is fastened to the LCD base 7.

That is, the brackets are first attached to the color LCD 2, and the ends of each bracket are attached to the base by using fastening screws 15. Accordingly, the color LCD 2 can be attached without providing holes in the LCD base 7.

Second Embodiment

Figure 3A:
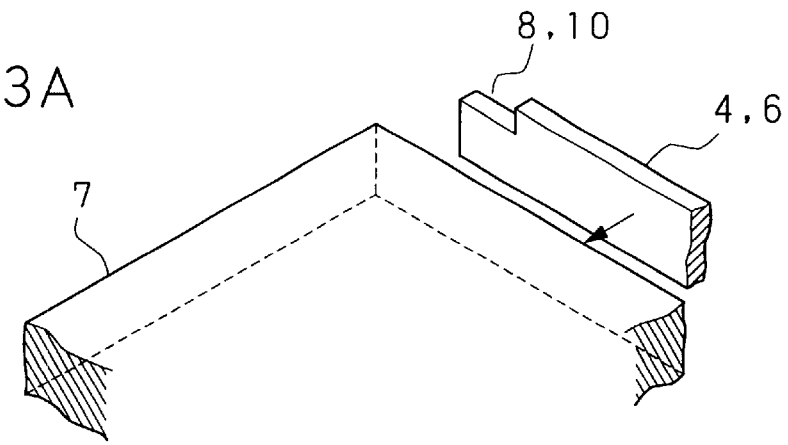
FIGS. 3A, 3B, and 3C are assembly drawings showing a series of steps for engaging the insert portion of the bracket and the rib provided in the upper face of the LCD base.
Figure 3B:
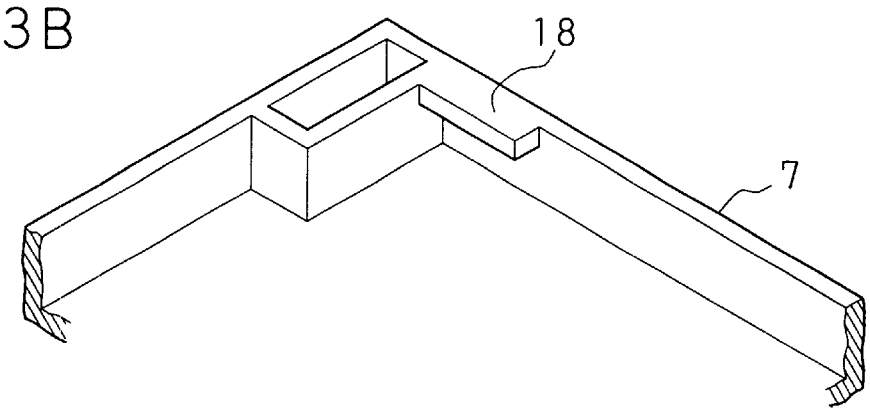

The second embodiment will be explained also using the assembly drawing FIG. 1. FIGS. 3A, 3B, and 3 are assembly drawings showing a series of steps for engaging insert portion 10 of bracket 4 and rib 18 provided in the upper (or top) face of LCD base 7.

The parts related to the present embodiment in FIG. 1 will be explained below. Reference numeral 1 indicates an LCD cover, reference numeral 2 indicates a color LCD, reference numerals 4 indicate brackets, reference numeral 7 indicates an LCD base, reference numerals 10 indicate insert portions, reference numerals 13 indicate bosses, reference numerals 9 and 14 indicate holes for fastening screws, reference numerals 11 indicate fastening screws, reference numerals 16 indicate latches, and reference numerals 17 and 18 indicate ribs.

With reference to FIG. 1, in the present embodiment, holes 14 are provided in brackets 3, and in the first step, the brackets 4 are attached to LCD 2 by using fastening screws 11. In the following step, the brackets 4 are attached to the LCD base 7 by (i) engaging the insert portions 10 (provided in the brackets) with corresponding ribs 18 (provided in the upper face of the base) (see FIGS. 3A to 3C), and (ii) inserting the fastening screws 15 via holes 9 (provided in brackets 4) into corresponding bosses 13 provided in the base 7. In the following step, four latches 16, 16 . . . provided in the LCD cover 1 are engaged with corresponding ribs 17 provided in the LCD base 7, so that the LCD cover 1 is fastened to the LCD base 7.

That is, the brackets are first attached to the color LCD 2, and one end of each bracket is engaged with rib 18 provided in the LCD base 7, and the other end is attached to the base by using fastening screw 15. Accordingly, the color LCD 2 can be attached without providing holes in the LCD base 7.

Third Embodiment

Figure 2:
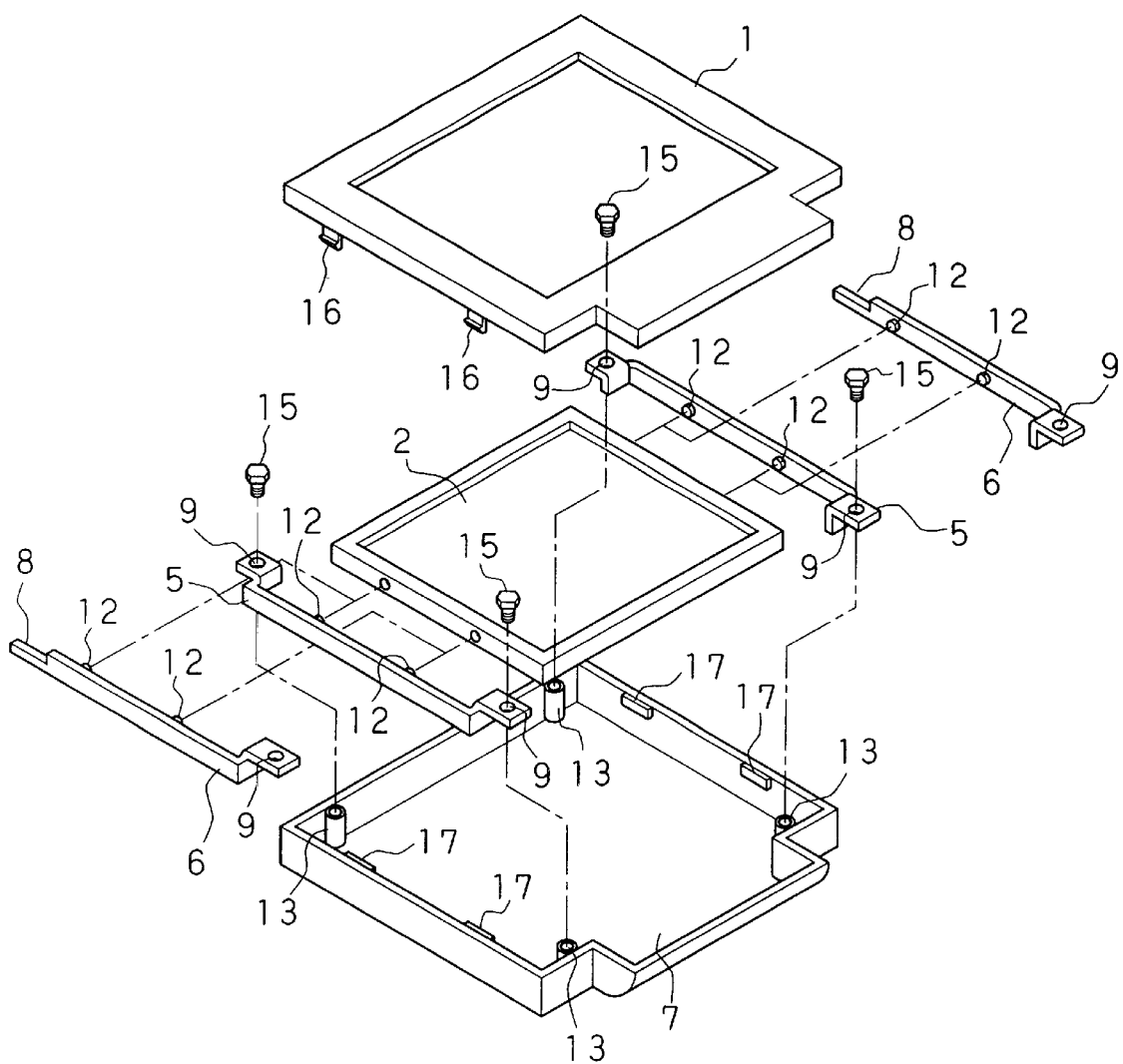
FIG. 2 is an assembly drawing for explaining the LCD fastening method and equipment of the second and fourth embodiments.

FIG. 2 is an assembly drawing for explaining the LCD fastening method and equipment of the third embodiment. In this figure, brackets 5 and 6 are shown as being used in the same equipment; however, these brackets are alternative parts or members, and are not used at the same time. Brackets 5 are used in the third embodiment, and brackets 6 are used in the fourth embodiment.

In FIG. 2, reference numeral 1 indicates an LCD cover, reference numeral 2 indicates a color LCD, reference numerals 5 indicate brackets, reference numeral 7 indicates an LCD base, reference numerals 12 indicate fastening protrusions, reference numerals 13 indicate bosses, reference numerals 9 indicate holes for fastening screws, reference numerals 15 indicate fastening screws, reference numerals 16 indicate latches, and reference numerals 17 indicate ribs.

With reference to FIG. 2, in the present embodiment, fastening protrusions 12 are provided in brackets 5, and in the first step, the brackets 5 are attached to LCD 2 by inserting fastening protrusions 12 into corresponding holes provided in the LCD 2. In the next step, the brackets 5 are attached to LCD base 7, by inserting the fastening screws 15 via holes 9 (provided in brackets 5) into corresponding bosses 13 provided in the base 7. In the following step, four latches 16, 16 . . . provided in the LCD cover 1 are engaged with corresponding ribs 17 provided in the LCD base 7.

That is, the brackets are first attached to the color LCD 2, and the ends of each bracket are attached to the base by using fastening screws 15. Accordingly, the color LCD 2 can be attached without providing holes in the LCD base 7.

Fourth Embodiment

Figure 3C:
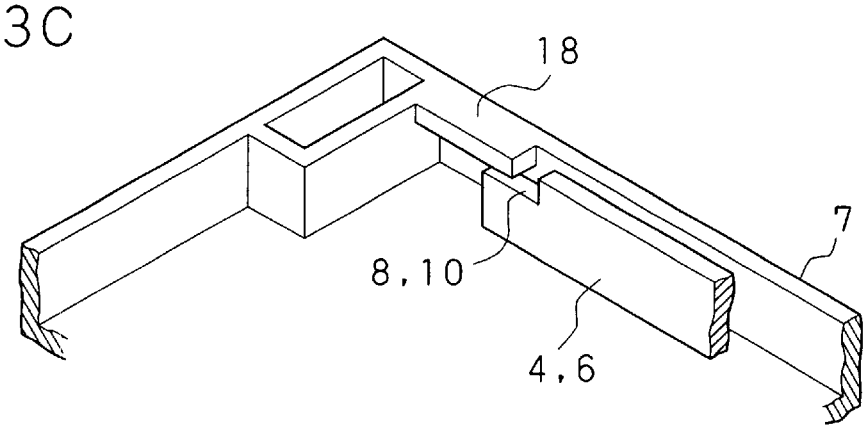
Figure 4:
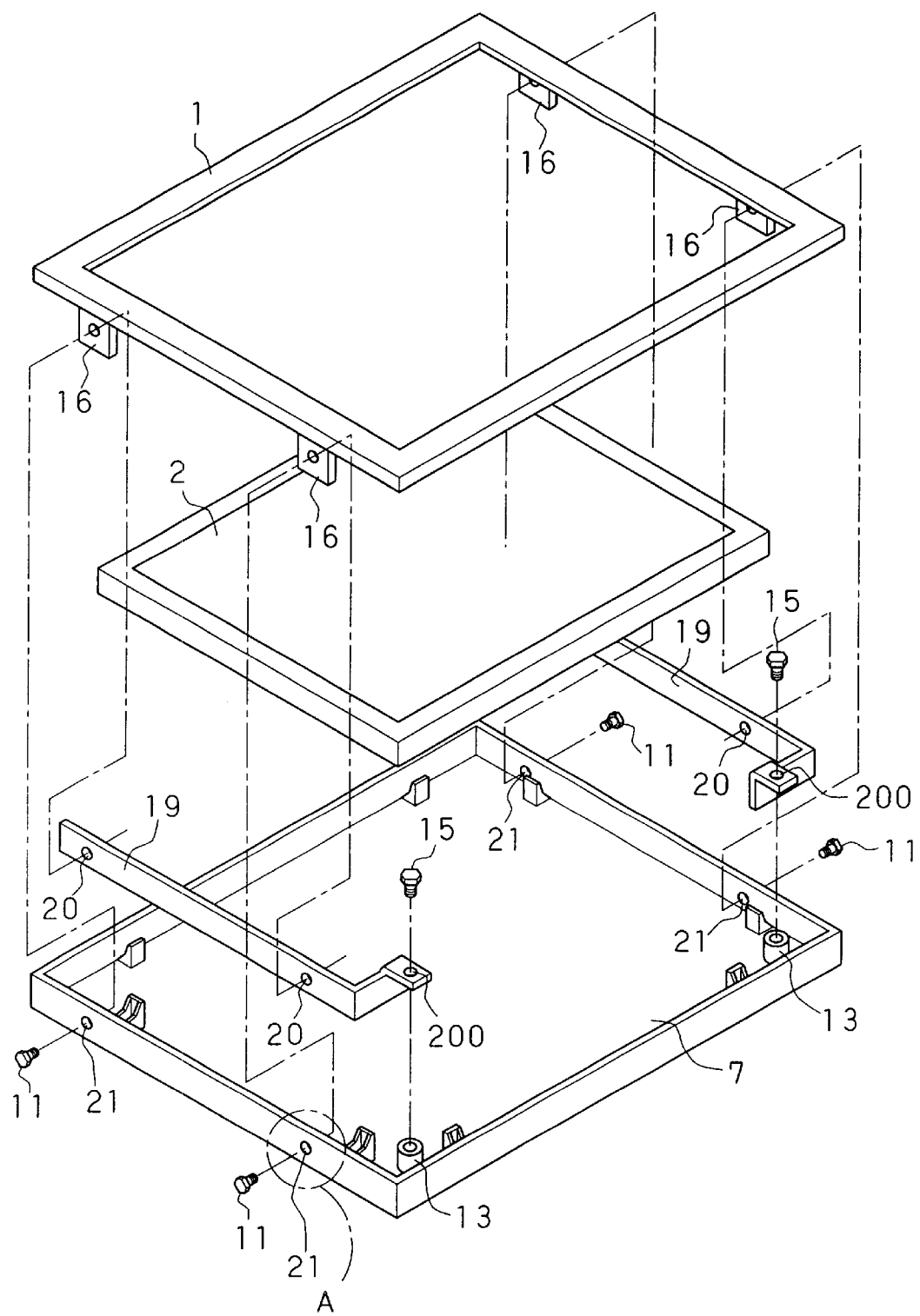
FIG. 4 is an assembly drawing for explaining a conventional method of fastening the LCD.
Figure 5:
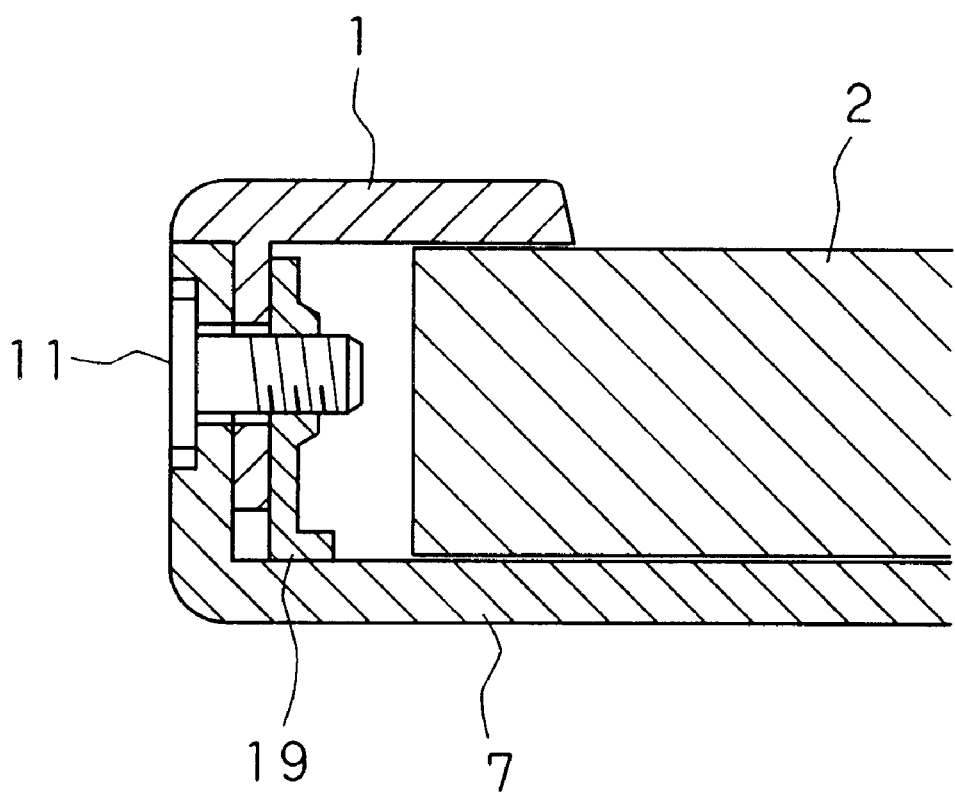
FIG. 5 is an enlarged view of portion A in FIG. 4.

The fourth embodiment will be explained also using the assembly drawings FIGS. 2 and 3A–3C. FIGS. 3A, 3B, and 3C also show a series of steps for engaging insert portion 8 of bracket 6 and rib 18 provided in the upper face of LCD base 7.

The parts related to the present embodiment in FIG. 2 will be explained below. Reference numeral 1 indicates an LCD cover, reference numeral 2 indicates a color LCD, reference numerals 6 indicate brackets, reference numeral 7 indicates an LCD base, reference numerals 8 indicate insert portions, reference numerals 12 indicate fastening protrusions, reference numerals 13 indicate bosses, reference numerals 9 indicate holes for fastening screws, reference numerals 15 indicate fastening screws, reference numerals 16 indicate latches, and reference numerals 17 and 18 indicate ribs.

With reference to FIGS. 2 and 3A–3C, in the present embodiment, fastening protrusions 12 are provided in brackets 6, and in the first step, the brackets 6 are attached to LCD 2 by inserting fastening protrusions 12 into corresponding holes provided in the LCD. In the next step, the brackets 6 are attached to the LCD base 7 by (i) engaging the insert portions 8 (provided in the brackets) with corresponding ribs 18 (provided in the upper face of the base) (see FIGS. 3A, 3B, and 3C), and (ii) inserting the fastening screws 15 via holes 9 (provided in brackets 6) into corresponding bosses 13 provided in the base 7. In the following step, four latches 16, 16 . . . provided in the LCD cover 1 are engaged with corresponding ribs 17 provided in the LCD base 7.

That is, the brackets are first attached to the color LCD 2, and one end of each bracket is engaged with a rib provided in the base, and the other end is attached to the base by using fastening screws 15. Accordingly, the color LCD 2 can be attached without providing holes in the LCD base 7.

As explained above, the following effects can be obtained according to the present embodiment.

The first effect is that a common LCD base (7) can be used for various kinds of color LCDs (2) without providing holes for fastening screws in the base, thereby reducing manufacturing man-hours.

The second effect is that a common LCD cover (1) can be used for various kinds of color LCDs (2) without providing holes for fastening screws in the cover, thereby reducing manufacturing man-hours.

The third effect is that the fastening method can be selected by selecting brackets (3, 4, 5, or 6) suitable for the relevant color LCD. Therefore, it is unnecessary to provide holes for fitting screws in the LCD base (7) and LCD cover (1), and preferable appearance will appeal to users.

What is claimed is:

1. An LCD fastening method comprising the steps of:
    attaching brackets to a color LCD using first fastening screws inserted through holes provided in the brackets;
    attaching the brackets to an LCD base by inserting second fastening screws through holes provided in the brackets into bosses provided in the LCD base; and
    attaching an LCD cover to the LCD base by engaging a predetermined number of latches provided in the LCD cover with corresponding first ribs provided in the LCD base.

2. An LCD fastening method as claimed in claim 1, wherein the step of attaching the brackets to the LCD base further includes engaging insert portions provided in the brackets with second ribs provided in an upper face of the LCD base.

3. An LCD fastening method comprising the steps of:
    attaching brackets to a color LCD by inserting fastening protrusions provided in the brackets into corresponding holes provided in the color LCD;
    attaching the brackets to an LCD base by inserting second fastening screws through holes provided in the brackets into bosses provided in the LCD base; and
    attaching an LCD cover to the LCD base by engaging a predetermined number of latches provided in the LCD cover with corresponding first ribs provided in the LCD base.

4. An LCD fastening method as claimed in claim 3, wherein the step of attaching the brackets to the LCD base further includes engaging insert portions provided in the brackets with second ribs provided in an upper face of the LCD base.

5. LCD fastening equipment comprising:
    brackets attached to a color LCD by using first fastening screws inserted through holes provided in the brackets;
    an LCD base to which the brackets are attached by inserting second fastening screws through holes provided in the brackets into bosses provided in the LCD base; and
    an LCD cover attached to the LCD base by engaging a predetermined number of latches provided in the LCD cover with corresponding first ribs provided in the LCD base.

6. LCD fastening equipment as claimed in claim 5, wherein the brackets further include insert portions engaged with second ribs provided in an upper face of the LCD base.

7. LCD fastening equipment comprising:
    brackets attached to a color LCD by inserting fastening protrusions provided in the brackets into corresponding holes provided in the color LCD;
    an LCD base to which the brackets are attached by inserting second fastening screws through holes provided in the brackets into bosses provided in the LCD base; and
    an LCD cover attached to the LCD base by engaging a predetermined number of latches provided in the LCD cover with corresponding first ribs provided in the LCD base.

8. LCD fastening equipment as claimed in claim 7, wherein the brackets further include insert portions engaged with second ribs provided in an upper face of the LCD base.

9. LCD fastening equipment as claimed in claim 7 in which the LCD cover is free of screw holes.

10. LCD fastening equipment as claimed in claim 5 in which the LCD cover is free of screw holes.

11. An LCD fastening method as claimed in claim 3 in which the LCD cover is free of screw holes.

12. An LCD fastening method as claimed in claim 1 in which the LCD cover is free of screw holes.

* * * * *